US 9,246,404 B2

(12) United States Patent
Urienza et al.

(10) Patent No.: US 9,246,404 B2
(45) Date of Patent: Jan. 26, 2016

(54) POWER CONVERTER WITH ACTIVE BLEEDING AND RAMP UP-DOWN DELAY AND THE METHOD THEREOF

(75) Inventors: Joseph Urienza, Milpitas, CA (US); Yiqing Jin, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 532 days.

(21) Appl. No.: 13/552,588

(22) Filed: Jul. 18, 2012

(65) Prior Publication Data

US 2013/0077364 A1    Mar. 28, 2013

Related U.S. Application Data

(63) Continuation of application No. 13/247,842, filed on Sep. 28, 2011.

(51) Int. Cl.
*H02M 7/04* (2006.01)
*H02M 7/217* (2006.01)
*H02M 3/335* (2006.01)

(52) U.S. Cl.
CPC ........ *H02M 7/2176* (2013.01); *H02M 3/33592* (2013.01); *H02M 7/217* (2013.01)

(58) Field of Classification Search
CPC ....... H02H 7/1252; H02H 7/125; H02M 1/44; H02M 2001/322; H02M 7/062; H02M 7/04; H02M 7/2176; H02M 7/217; Y02B 70/126
USPC .............................. 363/84, 127, 81
See application file for complete search history.

(56) References Cited

U.S. PATENT DOCUMENTS

| | | | |
|---|---|---|---|
| 5,615,097 A * | 3/1997 | Cross | 363/84 |
| 6,072,708 A | 6/2000 | Fischer | |
| 6,362,611 B1 * | 3/2002 | Utsunomiya | 323/282 |
| 7,554,307 B2 | 6/2009 | Moraveji | |
| 7,679,350 B2 | 3/2010 | Falvey et al. | |
| 8,064,202 B2 | 11/2011 | Yin et al. | |
| 2001/0043480 A1 | 11/2001 | Shona | |
| 2004/0008529 A1 | 1/2004 | George | |
| 2004/0170036 A1 | 9/2004 | Iwahori | |
| 2005/0099164 A1 * | 5/2005 | Yang | 323/266 |
| 2006/0044854 A1 | 3/2006 | Bocchiola et al. | |
| 2006/0083038 A1 | 4/2006 | Lynch | |
| 2008/0054991 A1 | 3/2008 | Maejima | |
| 2008/0084196 A1 | 4/2008 | Lacombe et al. | |
| 2011/0043177 A1 * | 2/2011 | Chen et al. | 323/283 |
| 2011/0080761 A1 | 4/2011 | Kung | |
| 2012/0176055 A1 * | 7/2012 | Hong et al. | 315/200 R |
| 2012/0286663 A1 * | 11/2012 | Puvanakijjakorn et al. | 315/85 |

OTHER PUBLICATIONS

U.S. Appl. No. 12/956,351, filed Nov. 30, 2010, Disney et al.
U.S. Appl. No. 13/212,115, filed Aug. 17, 2011, Urienza.
U.S. Appl. No. 13/457,857, filed Apr. 27, 2012, Li et al.

* cited by examiner

*Primary Examiner* — Fred E Finch, III
*Assistant Examiner* — Gustavo Rosario Benitez
(74) *Attorney, Agent, or Firm* — Perkins Coie LLP

(57) ABSTRACT

The present disclosure discloses a power converter providing a low output voltage from an offline AC. The power converter defines a voltage window for the input AC signal. Inside the voltage window, the rectified DC waveform is passed through to the output and the storage capacitor; outside the voltage window, the power converter is idle (or the output is blocked from input) and let the output storage capacitor alone supply the load.

14 Claims, 11 Drawing Sheets

POWER CONVERTER WITH ACTIVE BLEEDING AND RAMP UP-DOWN DELAY AND THE METHOD THEREOF

CROSS-REFERENCE TO RELATED APPLICATION(S)

This application is a continuation-in-part of U.S. patent application Ser. No. 13/247,842, filed on 28 Sep. 2011.

TECHNICAL FIELD

The present disclosure relates to offline low voltage sources.

BACKGROUND

Typical application circuits require low voltage bias source to operate. But sometimes only the utility AC is available. So there is a need to generate this low voltage bias source directly off the AC line.

Figure 1:
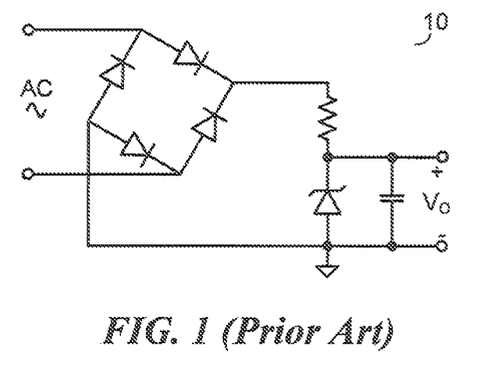
FIG. 1 schematically shows a prior art linear power supply 10 which provides a low voltage bias source from the offline AC.

FIG. 1 schematically shows a prior art linear power supply 10 which provides a low voltage bias source from the offline AC. The linear power supply 10 is simple but lossy as a rectifier resistor-zener diode circuit.

Figure 2:
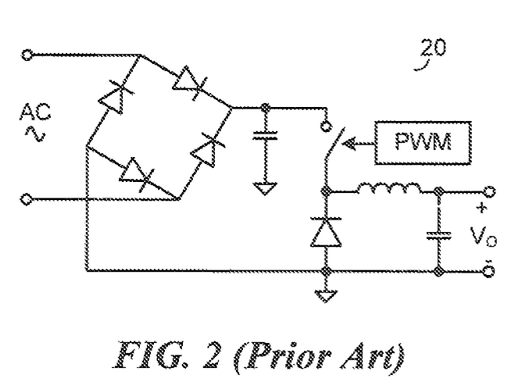
FIG. 2 schematically shows a prior art switch mode power supply 20 which provides a low voltage bias source from the offline AC.

FIG. 2 schematically shows a prior art switch mode power supply 20 which provides a low voltage bias source from the offline AC. However, PWM control may be an overkill approach for just a simple bias circuit.

Figure 3:
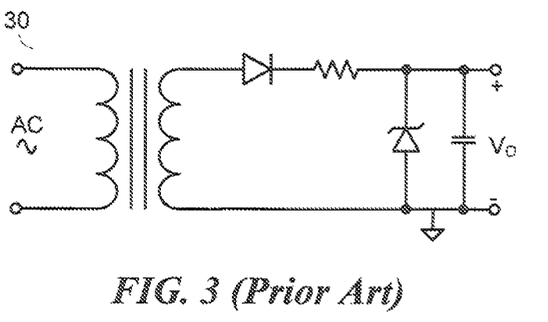
FIG. 3 schematically shows a prior art step-down transformer power supply 30 which provides a low voltage bias source from AC line.

FIG. 3 schematically shows a prior art step-down transformer power supply 30 which also provides a low voltage bias source from the offline AC. The step-down transformer power supply 30 is large in volume and high in cost, which is not acceptable for most applications.

So there is a need for a simple, efficient and cost effective low voltage dc source converted directly off the AC line.

SUMMARY

It is an object of the present disclosure to provide a power converter that is simple and efficient.

In accomplishing the above and other objects, there has been provided, in accordance with an embodiment of the present disclosure, a power converter, comprising: an input port configured to receive an input AC signal; a rectifier coupled to the input port to receive the input AC signal, and based on the input AC signal, the rectifier provides a rectified DC signal; a storage port configured to provide a storage voltage; a storage capacitor coupled between the storage port and the reference ground to store energy; a first high voltage power device coupled to the rectifier to receive the rectified DC signal; a power switch device coupled in series with the first high voltage power device, wherein the first high voltage power device together with the power switch device blocks or passes through the rectified DC signal to the storage port; and a switch controller having a first input terminal coupled to a line voltage sense signal indicative of the voltage level of the rectified DC signal, and wherein based on the line voltage sense signal, the switch controller provides a control signal to the power switch device.

In addition, there has been provided, in accordance with an embodiment of the present invention, a power converter, comprising: a first input port, a second input port, wherein the first input port and the second input port are configured to receive an input AC signal; a storage port configured to provides a storage voltage; a first rectifier coupled to the first input port to receive the input AC signal, and based on the input AC signal, the first rectifier provides a first half-wave rectified DC signal; a second rectifier coupled to the second input port to receive the input AC signal, and based on the input AC signal, the second rectifier provides a second half-wave rectified DC signal; a first smart offline voltage source block having a first terminal, a second terminal, and an output terminal, wherein the first terminal is coupled to the first rectified to receive the first half-wave rectified DC signal, the second terminal is connected to a reference ground, and the output terminal is coupled to the storage port; a second smart offline voltage source block having a first terminal, a second terminal, and an output terminal, wherein the first terminal is coupled to the second rectified to receive the second half-wave rectified DC signal, the second terminal is connected to the reference ground, and the output terminal is coupled to the storage port; and a storage capacitor coupled between the storage port and the reference ground to store energy.

Furthermore, there has been provided, in accordance with an embodiment of the present invention, a method of supplying power to a load, comprising: receiving an input signal; rectifying the input signal to generate a rectified DC signal; passing through the rectified DC signal to generate a storage voltage to supply the load when the rectified DC signal is within a specific voltage window; and blocking the rectified DC signal to let a storage capacitor alone supplies the load when the rectified DC signal is outside the specific voltage window.

Furthermore, there has been provided, in accordance with an embodiment of the present invention, a power converter, comprising: an input port configured to receive an input AC signal; a rectifier coupled to the input port to receive the input AC signal, and based on the input AC signal, the rectifier provides a rectified DC signal; a storage port configured to provide a storage voltage; a storage capacitor coupled between the storage port and a reference ground to store energy; a first high voltage power device and a power switch device coupled in series between the rectifier and the storage port; and an active bleeding unit having a first input terminal, a second input terminal, a third input terminal and an output terminal, wherein the first input terminal is coupled to the storage port to receive the storage voltage, the second input terminal is configured to receive a voltage threshold, the third input terminal is coupled to the connection node of the rectifier and the first high voltage power device, and the output terminal is coupled to the storage port, wherein when the storage voltage falls to the voltage threshold, the active bleeding unit is turned on to pull down the rectified DC signal, and when the storage voltage is above the voltage threshold, the active bleeding unit is in an off state.

Furthermore, there has been provided, in accordance with an embodiment of the present invention, a power converter, comprising: an input port configured to receive an input AC signal; a rectifier coupled to the input port to receive the input AC signal, and based on the input AC signal, the rectifier provides a rectified DC signal; a storage port configured to provide a storage voltage; a storage capacitor coupled between the storage port and a reference ground to store energy; a first high voltage power device and a power switch device coupled in series between the rectifier and the storage port, to block or pass through the rectified DC signal to the storage port; a switch controller configured to receive a line voltage sense signal indicative of the voltage level of the rectified DC signal, and wherein based on the line voltage sense signal, the switch controller provides a control signal having a rising edge and a falling edge; and a ramp up/down delay circuit coupled to the switch controller to receive the control signal, wherein based on the control signal, the ramp up/down delay circuit generates a drive signal with a sloping ramp up and a sloping ramp down, and wherein the power switch device is controlled by the drive signal to be slowly turned on during the sloping ramp up and to be slowly turned off during the sloping ramp down.

Furthermore, there has been provided, in accordance with an embodiment of the present invention, a method used for a power converter configured to receive an input AC signal and to provide a storage voltage based thereupon, wherein the power converter comprises at least a power switch device and a storage capacitor, the method comprising: generating a control signal having arising edge and a falling edge when the input AC signal is inside an active voltage window; slowing down the rising edge and the falling edge of the control signal to generate a drive signal with a sloping ramp up and a sloping ramp down; controlling the power switch device to be slowly turned on during the sloping ramp up of the drive signal and to be slowly turned off during the sloping ramp down of the drive signal, to pass through the input AC signal to generate the storage voltage to replenish the capacitor charge and to supply a load; and blocking the input AC signal to let the storage capacitor alone supply the load when the input AC signal is outside the active voltage window.

BRIEF DESCRIPTION OF THE DRAWINGS

The use of the similar reference label in different drawings indicates the same of like components.

DETAILED DESCRIPTION

Embodiments of circuits for power converter with low output voltage are described in detail herein. In the following description, some specific details, such as example circuits for these circuit components, are included to provide a thorough understanding of embodiments of the disclosure. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

The present disclosure relates to circuits and methods of power conversion. The input AC voltage is first rectified to a DC voltage. Then the rectified DC voltage is monitored, and only when a specific voltage window is traversed, the rectified DC voltage is passed through.

Figure 4A:
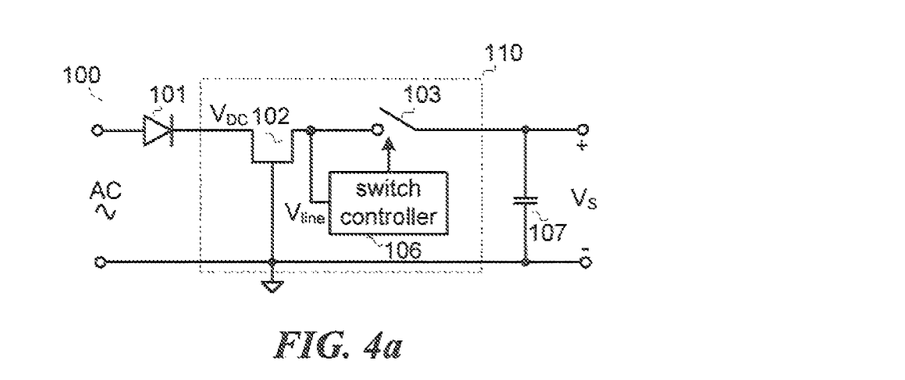
FIG. 4a schematically shows a power converter 100 in accordance with an embodiment of the present disclosure.

FIG. 4a schematically shows a power converter 100 in accordance with an embodiment of the present disclosure. In the example of FIG. 4a, the power converter 100 comprises: an input port configured to receive an input AC signal; a rectifier 101 coupled to the input port to receive the input AC signal, and based on the input AC signal, the rectifier 101 provides a rectified DC signal ($V_{DC}$); a storage port configured to provide a storage voltage ($V_S$); a smart offline voltage source block 110 having a first terminal, a second terminal, and an output terminal, wherein the first terminal is coupled to the rectifier 101 to receive the rectified DC signal, the second terminal is connected to a reference ground, and the output terminal is coupled to the storage port; and a storage capacitor 107 coupled between the storage port and the reference ground to store energy; wherein the smart offline voltage source block 110 comprises: a first high voltage power device 102 coupled to the rectifier 101 to receive the rectified DC signal; a power switch device 103 coupled in series with the first high voltage power device 102, wherein the first high voltage power device 102 together with the power switch device 103 block or pass through the rectified DC signal to the storage port; and a switch controller 106 having a first input terminal coupled to a line voltage sense signal ($V_{line}$) indicative of the voltage level of the line, rectified DC signal, and wherein based on the line voltage sense signal, the switch controller 106 provides a control signal to the power switch device 103.

In the example of FIG. 4a, the voltage drop the first high voltage power device 102 is not significant, the line voltage sense signal ($V_{line}$) is provided by the first high voltage power device 102.

In one embodiment, the rectifier 101 comprises a diode or bridge rectifiers. The diode may be integrated or may not be integrated.

In one embodiment, the first high voltage power device 102 comprises a JFET, or a FET, or any depletion devices, etc. . . . . This high voltage power device absorbs most the voltage drop and delivers only a maximum of pinch-off voltage at its source node.

In one embodiment, the power switch device 103 comprises a power NMOS, or a power PMOS, or a BJT, etc. . . . .

Figure 4B:
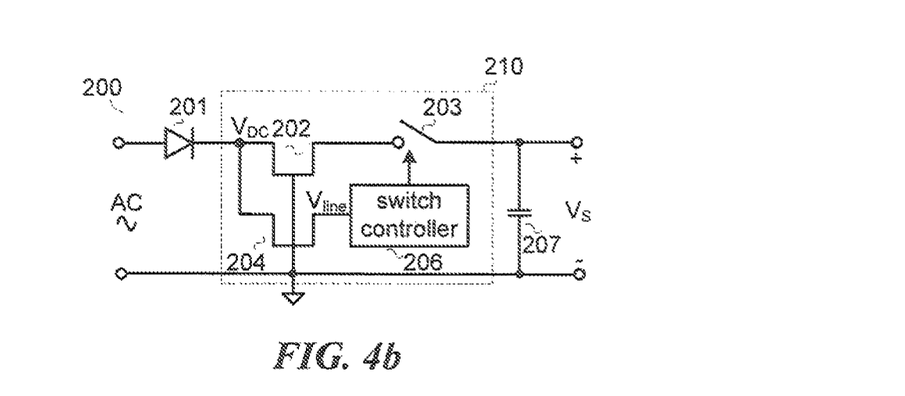
FIG. 4b schematically shows a power converter 200 in accordance with an embodiment of the present disclosure.

FIG. 4b schematically shows a power converter 200 in accordance with an embodiment of the present disclosure. Different to the power converter 100 in FIG. 4a, the smart offline voltage source block 210 in the power converter 200 further comprises a second high voltage power device 204 coupled to the rectifier 201 to receive the rectified DC signal, and based on the rectified DC signal, the second high voltage power device 204 provides the line voltage sense signal ($V_{line}$) indicative of the voltage level of the rectified DC signal.

Figure 4C:
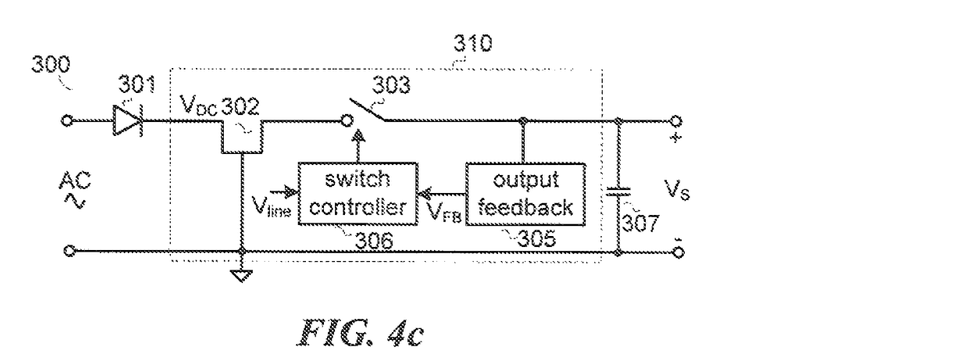
FIG. 4c schematically shows a power converter 300 in accordance with an embodiment of the present disclosure.

In some situations, the maximum voltage of the storage voltage ($V_S$) needs to be limited. Thus, an output feedback unit may be needed. FIG. 4c schematically shows a power converter 300 in accordance with an embodiment of the present disclosure. Different to the power converter 100 in FIG. 4a, the smart offline voltage source block 310 in the power converter 300 further comprises an output feedback unit 305 coupled to the storage port to receive the storage voltage ($V_S$), and based on the storage voltage ($V_S$), the output feedback unit provides a feedback signal ($V_{FB}$). And the switch controller 306 further comprises a second input terminal coupled to the output feedback unit 305 to receive the feedback signal ($V_{FB}$), and wherein the switch controller 306 provides the control signal based on the line voltage sense signal ($V_{line}$) and the feedback signal. In one line, embodiment, the line voltage sense signal ($V_{line}$) may be provided by the first high voltage power device as in FIG. 4a. In other embodiments, the line voltage sense signal ($V_{line}$) may be provided by the second high voltage power device as in FIG. 4b.

In the examples of FIG. 4a/4b/4c, the first high voltage power device and the second high voltage power device has a control terminal connected to the reference ground, respectively. The smart offline voltage source block controls the passage of the rectified DC signal coupled from the rectifier to the storage port. The stored charge in the storage capacitor is then utilized to power the load directly or may go through another stage of voltage regulator.

When the power converter 300 is in operation, the input AC signal is turned to the rectified DC signal ($V_{DC}$) via the rectifier 301; the rectified DC signal ($V_{DC}$) is then delivered to the first high voltage power device 302. In the case of JFET device as the first high voltage power device 302, when the rectified DC signal ($V_{DC}$) is lower than the pinch-off voltage ($V_P$) of the first high voltage power device 302, the first high voltage power device 302 source voltage follows its drain voltage. However, when the rectified DC signal is higher than the pinch-off voltage ($V_P$), the first high voltage power device 302 source voltage stays at the pinch-off voltage ($V_P$). Accordingly, the storage voltage at the storage capacitor 307 follows the rectified DC signal ($V_{DC}$). However, due to non-ideal effects, being resistive power path from the input port to the output port (the first high voltage power device 302 and the power switch device 303) of the offline voltage source block 310 and also depending on the external storage capacitor size, the storage voltage $V_S$ may not fully follow the rectified DC signal.

The rectified DC signal and the storage voltage are being monitored. When both the line voltage sense signal and the feedback signal are within the specified range of active operation, e.g. the line voltage sense signal indicates that the rectified DC signal is higher than a threshold $V_{P1}$, the switch controller 306 turns on the power switch device 303. When the line voltage sense signal is outside the input active voltage range, the smart offline voltage source block 310 blocks the rectified DC signal to the storage port. Or when the feedback signal indicates that the storage voltage is exceeding the target peak voltage, the smart offline voltage source block 310 also blocks the rectified DC signal to the storage port. When the first high voltage power device 302 and the power switch device 303 are on, the storage capacitor 307 is being charged, and the load is being supplied by the rectified DC signal; when the power switch device, 303 is off, the storage capacitor 307 alone then supplies power to the load of the power converter 300. That is, the power converter 300 defines a voltage window (0~$V_P$ or $V_{P1}$~$V_P$) for the rectified DC signal, i.e., a voltage window range for the input AC signal. Inside the voltage window, the rectified DC signal is passed through to the storage port; outside the voltage window, the power converter 300 becomes idle and lets the storage capacitor 307 supply the load.

In one embodiment, the power switch device 303 may be under constant on time control. When the line voltage sense signal indicates that the rectified signal crosses the threshold ($V_{p1}$), the power switch device 303 is controlled to be turned on for a fixed length of time. Similarly in operation, as another embodiment, the power switch 303 may just be ON for burst of pulses either by hysteretic control or by PWM. Fixed-width pulses or by inverse line feed forward PWM. In inverse line feed forward PWM control, the pulses' width becomes narrower as the rectified DC line voltage rises. Conversely, the pulses' width becomes wider when the rectified DC line voltage falls. These methods may allow wider voltage range of active window operation without introducing excessive power dissipation.

Figure 5:
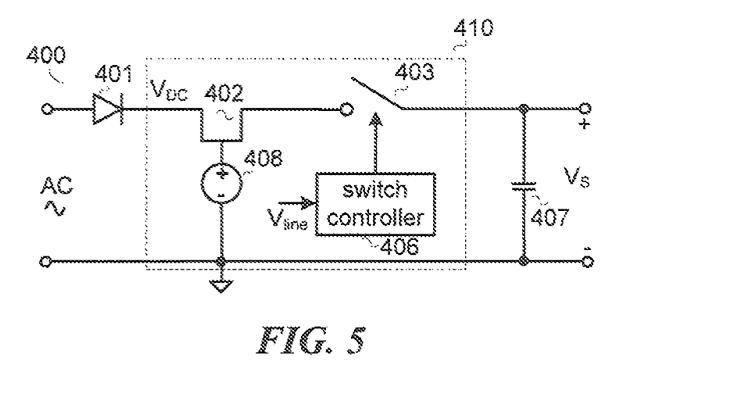
FIG. 5 schematically shows a power converter 400 in accordance with an embodiment of the present disclosure.

FIG. 5 schematically shows a power converter 400 in accordance with an embodiment of the present disclosure.

Compared to the power converter 100 in FIG. 4*a*, the power converter 400 in FIG. 5 further comprises a voltage bias 408 coupled between the control terminal of the first high voltage power device 402 and the reference ground, wherein the voltage level of the voltage bias 408 is $V_1$, which may be programmable.

The operation of the power converter 400 is similar to the operations of the power converter 100/200/300. In the case of JFET device as the first high voltage power device 402, the first high voltage power device 402 source voltage follows its drain voltage when the rectified DC signal ($V_{DC}$) is lower than the pinch-off voltage ($V_P$) of the first high voltage power device 402 added with the voltage level $V_1$. That is, the power converter 400 defines a voltage window $[V_{P1} \sim (V_P + V_1)]$ or $[0 \sim (V_P + V_1)]$ for the rectified DC signal.

Figure 6:
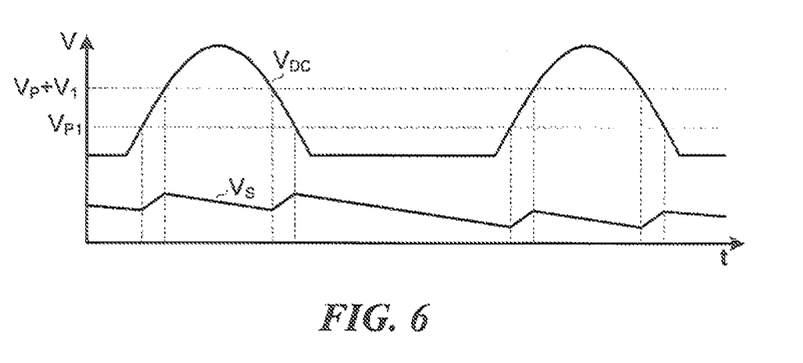
FIG. 6 shows a timing diagram of the half-wave rectified DC signal ($V_{DC}$) and the output signal ($V_O$) in the power converter 400 of FIG. 5.

FIG. 6 illustrates a timing diagram of the rectified DC signal ($V_{DC}$) and the storage voltage ($V_S$) in the power converter 400 of FIG. 5.

As shown in FIG. 6, the storage voltage ($V_S$) increases when the rectified DC signal is inside the voltage window $[(V_{P1}) \sim (V_P + V_1)]$; and the storage voltage ($V_S$) decreases when the rectified DC signal is outside the voltage window $[(V_{P1}) \sim (V_P + V_1)]$ and when load is present.

As is seen in FIG. 6, the rectified DC signal ($V_{DC}$) is a half-wave, i.e., the power converter 100/200/300/400 is in half-wave operation. One skilled in the art should realize that the power converter with smart offline voltage source block may also be in full-wave operation, or in any multi-phase system, e.g. in a 3-phase line system.

Figure 7:
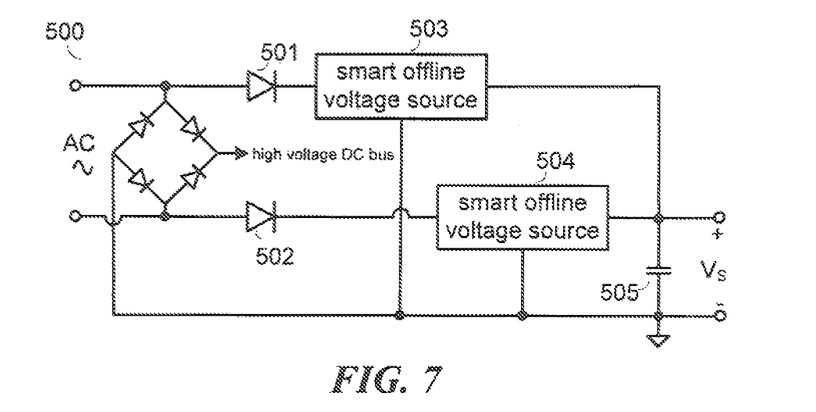
FIG. 7 schematically shows a power converter 500 in accordance with an embodiment of the present disclosure.

FIG. 7 schematically shows a power converter 500 with full wave operation in accordance with an embodiment of the present disclosure. In the example of FIG. 7, the power converter 500 comprises: a first input port, a second input port, wherein the first input port and the second input port are configured to receive an input AC signal; a storage port configured to provide a storage voltage ($V_S$); a first rectifier 501 coupled to the first input port to receive the input AC signal, and based on the input AC signal, the first rectifier 501 provides a first half-wave rectified DC signal; a second rectifier 502 coupled to the second input port to receive the input AC signal, and based on the input AC signal, the second rectifier 502 provides a second half-wave rectified DC signal; a first smart offline voltage source block 503 having a first terminal, a second terminal, and an output terminal, wherein the first terminal is coupled to the first rectifier 501 to receive the first half-wave rectified DC signal, the second terminal is connected to a reference ground, and the output terminal is coupled to the storage port; a second smart offline voltage source block 504 having a first terminal, a second terminal, and an output terminal, wherein the first terminal is coupled to the second rectifier 502 to receive the second half-wave rectified DC signal, the second terminal is connected to the reference ground, and the output terminal is coupled to the storage port; and a storage capacitor 505 coupled between the storage port and the reference ground to store energy which is supplied to a load or may go through another stage. In the example of FIG. 7, the outputs of the two smart offline voltage source blocks 503 and 504 are coupled functionally to the storage capacitor 305. One skilled in the art should realize that in other embodiments, two or more smart offline voltage source blocks may be connected together in parallel with the smart offline voltage source block 503/504 to increase the overall power capability. Methods of current load sharing or by inherent resistive ballasting among power devices may be applied to optimize power distribution among smart offline voltage source blocks.

In one embodiment, the first rectifier 501 and the second rectifier 502 comprise a diode. In other embodiments, the first rectifier 501 and the second rectifier 502 may comprise bridge rectifiers. The diode may be integrated or may not be integrated.

In one embodiment, the smart offline voltage source block 503/504 is configured similarly as the smart offline voltage source block 110 in the power converter 100 in FIG. 4*a*, or it is configured similarly as the smart offline voltage source block 210/310/410.

When the AC input signal is positive, i.e. the voltage level at the first input port is higher than that at the second input port, the first rectifier 501 is on, the first smart offline voltage source block 503 controls the passage of the first rectified DC signal coupled from the first rectifier 501 to the storage port. On the contrary, when the AC input signal is negative, i.e. the voltage level at the first input port is lower than that at the second input port, the second rectifier 502 is on, the second smart offline voltage source block 504 controls the passage of the second rectified DC signal coupled from the second rectifier 502 to the storage port.

In one embodiment, the power converter 500 further comprises a bridge diode coupled to the input signal to provide rectified signal to high voltage DC bus. Thus, it is easy to incorporate smart offline voltage source blocks to any power supply system.

Figure 8:
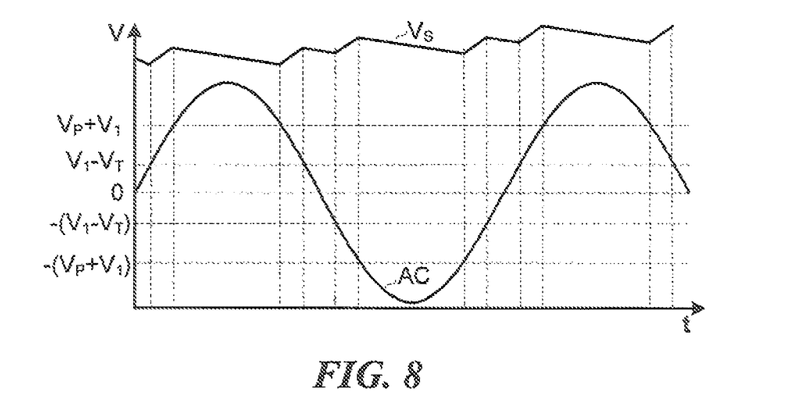
FIG. 8 shows a timing diagram of the input AC signal and the storage voltage in the power converter 500 of FIG. 7.

FIG. 8 shows a timing diagram of the input AC signal and the storage voltage ($V_S$) in the power converter 500 of FIG. 7.

The storage voltage at the storage capacitor may exhibits high ripple waveform, thus a post voltage regulator may be needed to smoothen the storage voltage.

Figure 9:
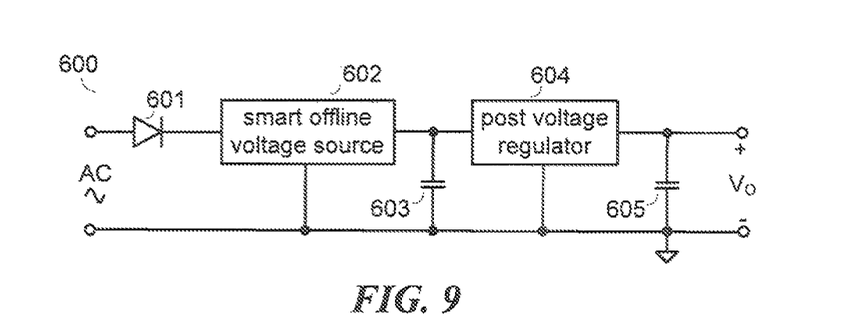
FIG. 9 schematically shows a power converter 600 in accordance with an embodiment of the present disclosure.

FIG. 9 schematically shows a power converter 600 in accordance with an embodiment of the present disclosure. In the example of FIG. 9, the power converter 600 comprises an input port configured to receive an input AC signal; a rectifier 601 coupled to the input port to receive the input AC signal, and based on the input AC signal, the rectifier 601 provides a rectified DC signal; a storage port configured to provide a storage voltage; an output port configured to provide an output voltage; a smart offline voltage source block 602 having a first terminal, a second terminal, and an output terminal, wherein the first terminal is coupled to the rectifier 601 to receive the rectified DC signal, the second terminal is connected to a reference ground, and the output terminal is coupled to the storage port; a storage capacitor 603 coupled between the storage port and the reference ground to store energy; a post voltage regulator 604 having a first terminal, a second terminal, and an output terminal, wherein the first terminal is coupled to the storage port to receive the storage voltage, the second terminal is connected to the reference ground, and the output terminal is coupled to the output port; and an output capacitor 605 coupled between the output port and the reference ground to provide the output voltage ($V_O$).

In one embodiment, the post voltage regulator 604 comprises a switch-mode regulator or a low dropout regulator.

The power converter 600 in the example of FIG. 9 is in half-wave operation. However, one skilled in the art should realize that the power converter could also be operational in full-wave operation.

Figure 10:
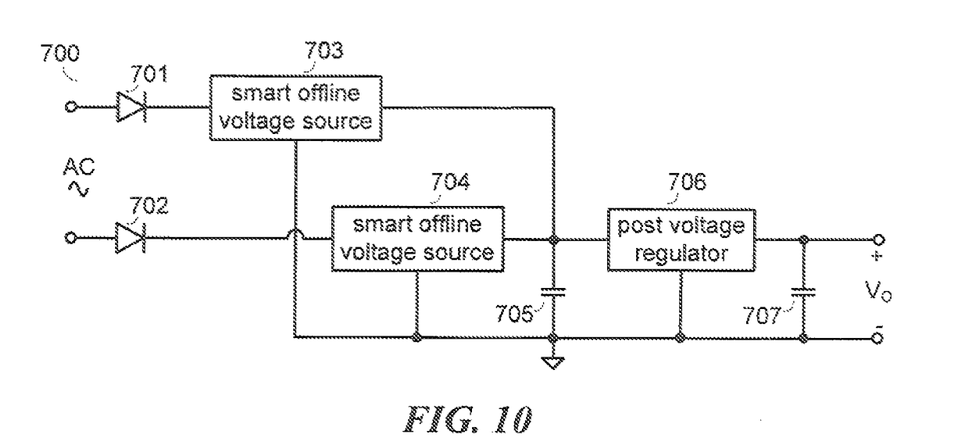
FIG. 10 schematically shows a power converter 700 in accordance with an embodiment of the present disclosure.

FIG. 10 schematically shows a power converter 700 in accordance with an embodiment of the present disclosure. The operation of the power converter 700 is similar to the power converter 500 in FIG. 7, wherein different to the power converter 500 in FIG. 7, the storage voltage at the storage port in the power converter 700 is further regulated by the post voltage regulator 706 and the output capacitor 707 to get the output voltage ($V_O$).

Figure 11:
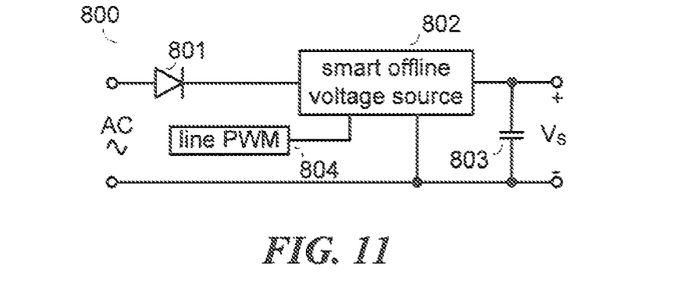
FIG. 11 schematically shows a power converter 800 in accordance with an embodiment of the present disclosure.

FIG. 11 schematically shows a power converter 800 in accordance with an embodiment of the present disclosure. Compared to the power converter 100 in FIG. 4*a*, the power converter 800 in FIG. 11 further comprises a line PWM unit 804 coupled to the smart offline voltage source block 802.

In one embodiment, the smart offline voltage source block 802 is configured similarly as the smart offline voltage source block 110 in the power converter 100 in FIG. 4*a*. The line PWM unit may be coupled to the switch controller, so that the switch controller provides a PWM control signal ($V_G$) to the power switch device.

Figure 12:
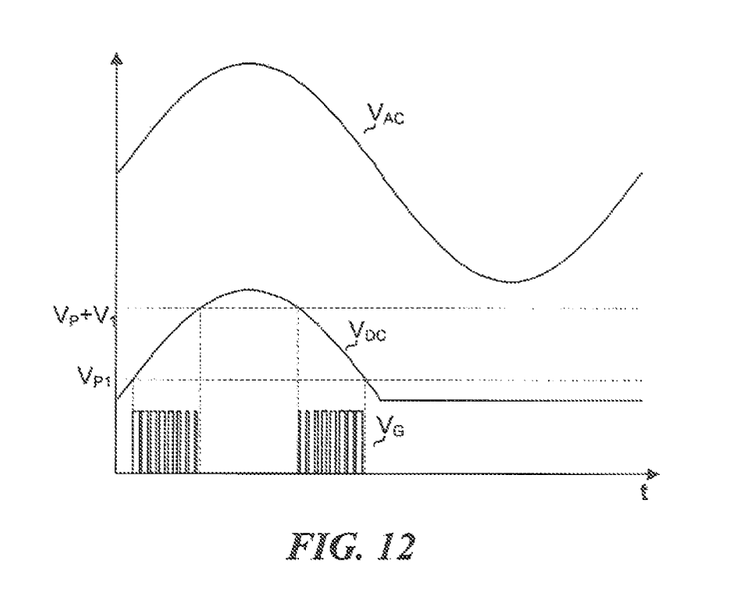
FIG. 12 schematically shows a timing diagram of the input AC signal ($V_{AC}$), the rectified DC signal ($V_{DC}$) and the PWM control signal ($V_G$) in the power converter 800 of FIG. 11.

FIG. 12 schematically shows a timing diagram of the input AC signal ($V_{AC}$), the rectified DC signal ($V_{DC}$) and the PWM control signal ($V_G$) in the power converter 800 of FIG. 11.

Figure 13:
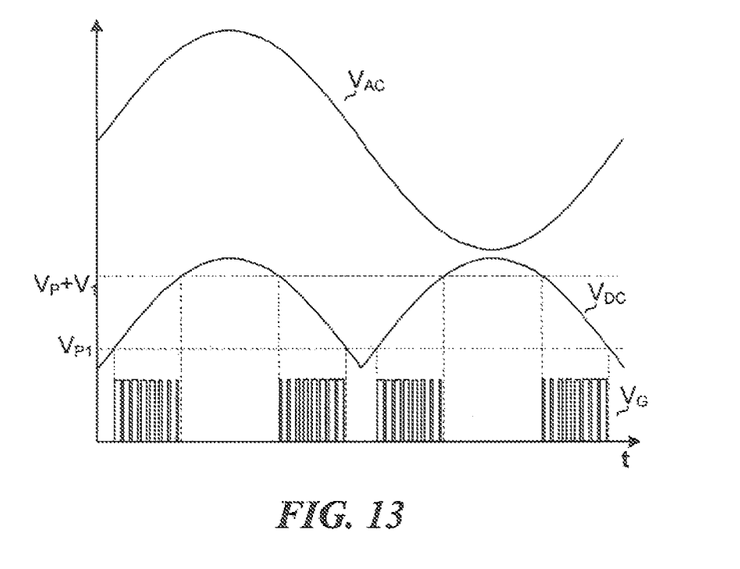
FIG. 13 schematically shows a timing diagram of the input AC signal ($V_{AC}$), the rectified DC signal ($V_{DC}$) and the PWM control signal ($V_G$) for inverse line feed forward PWM under full-wave operation.

In one embodiment, the line PWM unit may be replaced by an inverse line feed forward PWM unit, so that the active range may be wider than the regular range. FIG. 13 schematically shows a timing diagram of the input AC signal ($V_{AC}$), the rectified DC signal ($V_{DC}$) and the PWM control signal ($V_G$) for inverse line feed forward PWM under full-wave operation.

Figure 14:
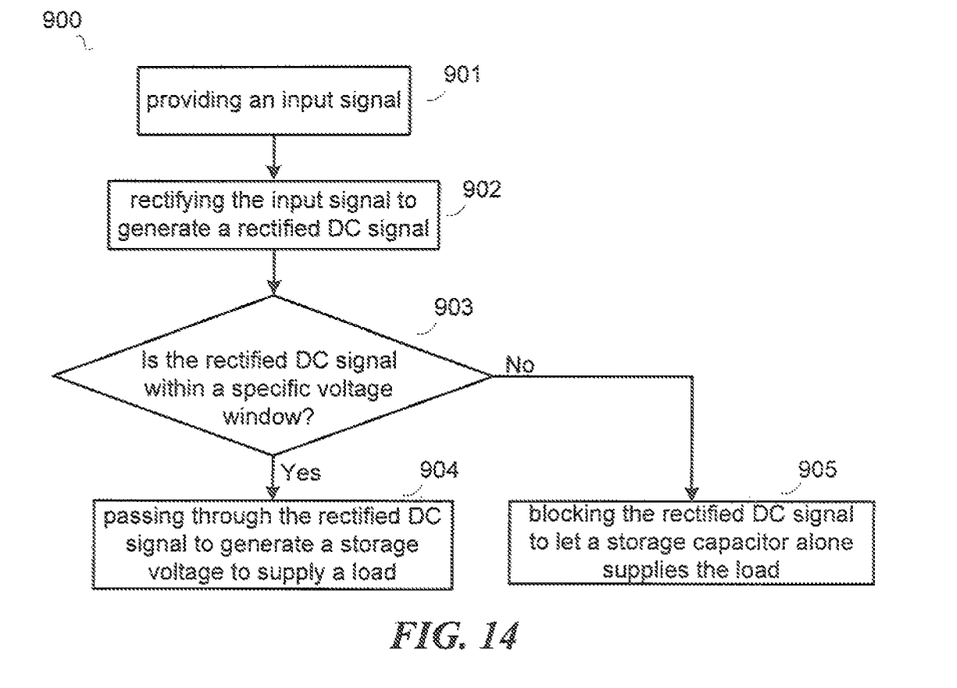
FIG. 14 schematic shows a flowchart 900 of a method in accordance with an embodiment of the present disclosure.

FIG. 14 schematic shows a flowchart 900 of a method in accordance with an embodiment of the present disclosure. The method comprises:

Step 901, providing an input signal.

Step 902, rectifying the input signal to generate a rectified DC signal. In one embodiment, the rectified DC signal is generated by a diode or bridged diodes.

Step 903, judging whether the rectified DC signal is within a specific voltage window. If the rectified DC signal is within the specific voltage window, go to step 904; if the rectified DC signal is outside the specific voltage window, go to step 905.

Step 904, passing through the rectified DC signal to generate a storage voltage to supply a load.

Step 905, blocking the rectified DC signal to let a storage capacitor alone supplies the load.

In one embodiment, the method further comprises: clamping the rectified DC signal to a lower voltage; monitoring the rectified DC signal to generate a line voltage sense signal indicative of the rectified DC signal; and comparing the line voltage sense signal with a threshold to determine whether the rectified DC signal is within the specific voltage window.

In one embodiment, the method further comprises: judging whether the storage voltage has an acceptable ripple; if the ripple is acceptable, directly utilizing the storage voltage as an output voltage; if the ripple is not acceptable, using a post voltage regulator to smoothen the storage voltage.

In real world, there is parasitic or stray capacitance at the rectifier, which may cause the rectified DC signal ($V_{DC}$) not to fall to zero. Accordingly, the actual rectified waveform in the active voltage window may get influenced (or may miss the active voltage window range) and the storage voltage ($V_S$) at the storage port may fall to an unacceptable low level.

Prior art uses a passive bleeder (e.g., a resistor) to help pull down the rectified DC signal. However, the passive bleeding is lossy, which decreases the efficiency of the power converter.

Figure 15:
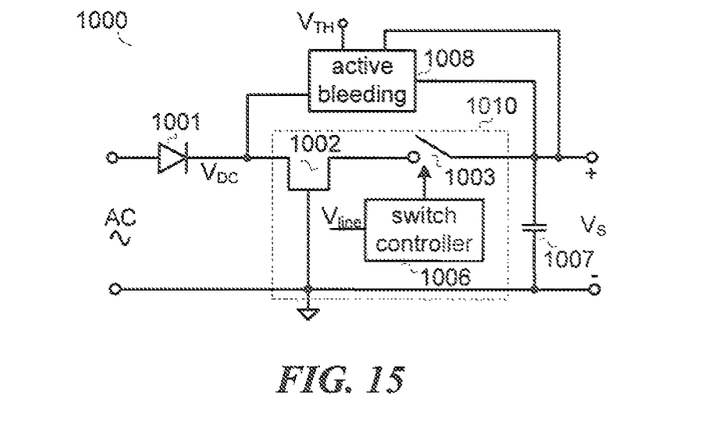
FIG. 15 schematically shows a power converter 1000 in accordance with an embodiment of the present disclosure.

FIG. 15 schematically shows a power converter 1000 in accordance with an embodiment of the present disclosure. The power converter 1000 is similar to the power converter 100 in FIG. 4*a*, with a difference that the power converter in FIG. 15 further comprises: an active bleeding unit 1008 having a first input terminal, a second input terminal, a third input terminal and an output terminal, wherein the first input terminal is coupled to the storage port to receive the storage voltage ($V_S$), the second input terminal is configured to receive a voltage threshold ($V_{TH}$), the third input terminal is coupled to the connection node of the rectifier 1001 and the first high voltage power device 1002, and the output terminal is coupled to the storage port, wherein when the storage voltage ($V_S$) falls to the voltage threshold ($V_{TH}$), the active bleeding unit 1008 is turned on to pull down the rectified DC signal $V_{DC}$, and when the storage voltage is above the voltage threshold, the active bleeding unit 1008 is in an off state.

Figure 16:
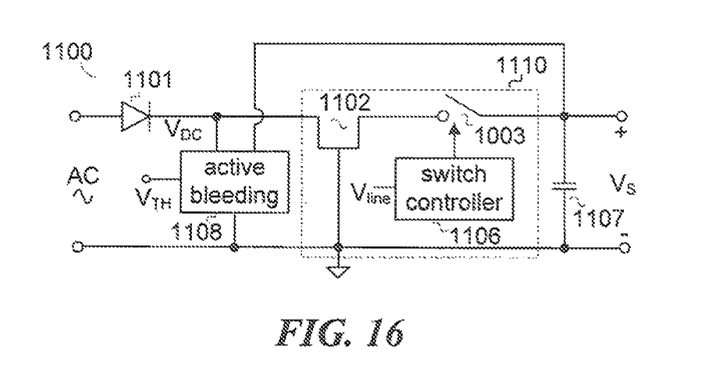
FIG. 16 schematically shows a power converter 1100 in accordance with an embodiment of the present disclosure.

FIG. 16 schematically shows a power converter 1100 in accordance with an embodiment of the present disclosure. The power converter 1100 is similar to the power converter 1000 in FIG. 15, with a difference that the output terminal of the active bleeding unit 1108 in FIG. 16 is connected to the reference ground, wherein when the storage voltage ($V_S$) falls to the voltage threshold ($V_{TH}$), the active bleeding unit 1108 is turned on to pull the rectified DC signal $V_{DC}$ to the reference ground, and when the storage voltage is above the voltage threshold, the active bleeding unit 1108 is in the off state.

Figure 17:
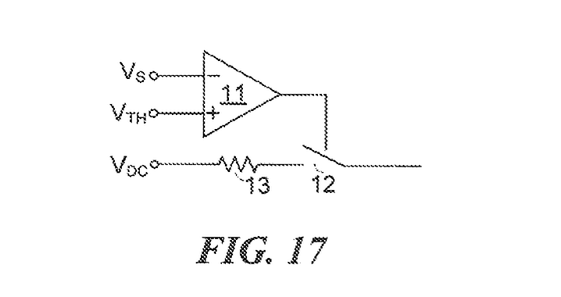
FIG. 17 schematically shows a detailed configuration of the active bleeding unit in the power converter 1000/1100 in FIG. 15/16 in accordance with an embodiment of the present disclosure.

FIG. 17 schematically shows a detailed configuration of the active bleeding unit in the power converter 1000/1100 in FIG. 15/16 in accordance with an embodiment of the present disclosure. As shown in FIG. 17, the active bleeding unit comprises: a comparator 11 having a first input terminal, a second input terminal and an output terminal, wherein the first input terminal is configured to receive the storage voltage $V_S$, the second input terminal is configured to receive the voltage threshold $V_{TH}$, wherein based on the storage voltage $V_S$ and the voltage threshold $V_{TH}$, the comparator 11 generates a comparison signal at the output terminal; a discharge switch 12 and a discharge resistor 13 coupled in series between the third input terminal and the output terminal of the active bleeding unit, wherein the discharge switch 12 has a control terminal coupled to the output terminal of the comparator 11 to receive the comparison signal, wherein based on the comparison signal, the discharge switch 12 is controlled to be turned ON and OFF.

Figure 18:
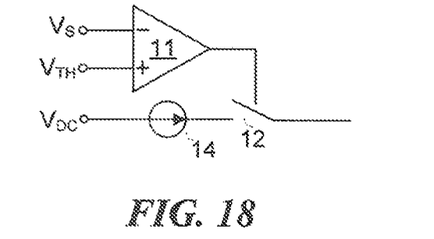
FIG. 18 schematically shows another detailed configuration of the active bleeding unit in the power converter 1000/1100 in FIG. 15/16 in accordance with an embodiment of the present disclosure.

FIG. 18 schematically shows another detailed configuration of the active bleeding unit in the power converter 1000/1100 in FIG. 15/16 in accordance with an embodiment of the present disclosure. As shown in FIG. 18, the active bleeding unit comprises: a comparator 11 having a first input terminal, a second input terminal and an output terminal, wherein the first input terminal is configured to receive the storage voltage $V_S$, the second input terminal is configured to receive the voltage threshold $V_{TH}$, wherein based on the storage voltage $V_S$ and the voltage threshold $V_{TH}$, the comparator 11 generates a comparison signal at the output terminal; a discharge switch 12 and a discharge current source 14 coupled in series between the third input terminal and the output terminal of the active bleeding unit, wherein the discharge switch 12 has a control terminal coupled to the output terminal of the comparator 11 to receive the comparison signal, wherein based on the comparison signal, the discharge switch 12 is controlled to be turned ON and OFF.

In one embodiment, the discharge current source comprises a BJT (Bipolar Junction Transistor) or a FET (Field Effect Transistor).

When the storage voltage $V_S$ is higher than the voltage threshold $V_{TH}$, the comparison signal generated by the comparator 11 is logical low. Accordingly, the discharge switch 12 is OFF, which blocks the rectified DC signal $V_{DC}$ from being bled to the storage port or to the reference ground. But when the storage voltage $V_S$ falls below the voltage threshold $V_{TH}$, the comparison signal generated by the comparator 11 goes to be high. Accordingly, the discharge switch 12 is turned ON. Then the discharge resistor 13 (or the discharge current source 14) and the discharge switch 12 forms the passage of the rectified DC signal $V_{DC}$ coupled from the rectifier to the storage port or to the reference ground. As a result, the rectified DC signal ($V_{DC}$) is pulled down, which eliminates the effect of the parasitic or stray capacitance.

During the operation of the power converter, the power switch device switches between ON and OFF states. During the turn-on/turn-off of the power switch device, the slew rate of a current flowing through the power switch device may be high, which may bring EMI (Electro Magnetic Interference) issue.

In order to solve the above EMI problem, in one embodiment, the power switch device is controlled to be slowly turned on (i.e., the gate voltage/base current is controlled to slowly rise) for a first set period just after the rectified DC signal ($V_{DC}$) enters the voltage window and to be slowly turned off (i.e., the gate voltage/base current is controlled to slowly fall) for a second set period when the rectified DC signal ($V_{DC}$) exits the voltage window; and to be on at the remaining time when the rectified DC signal ($V_{Dc}$) is inside the voltage window.

In one embodiment, the first set period has same time duration as the second set period.

Figure 19:
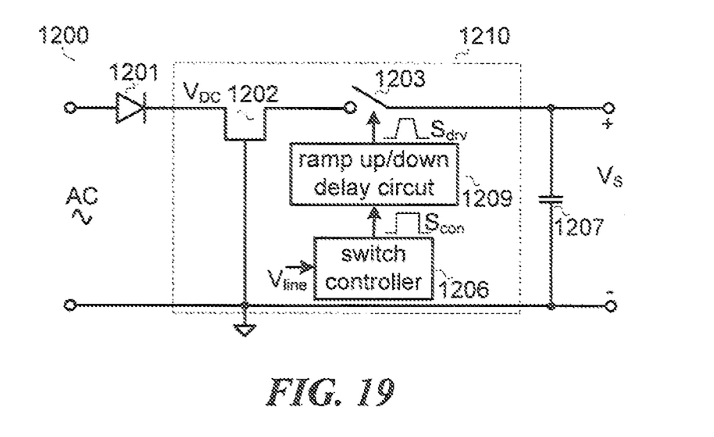
FIG. 19 schematically shows a power converter 1200 in accordance with an embodiment of the present disclosure.

FIG. 19 schematically shows a power converter 1200 in accordance with an embodiment of the present disclosure. The power converter 1200 is similar to the power converter 100 in FIG. 4a, with a difference that the power converter 1200 in FIG. 19 further comprises: a ramp up/down delay circuit 1209 coupled to the switch controller 1206 to receive the control signal $S_{con}$ having a rising edge and a falling edge that are substantially vertical, wherein based on the control signal $S_{con}$, the ramp up/down delay circuit 1209 generates a drive signal $S_{drv}$ with a sloping ramp up and a sloping ramp down, and wherein the power switch device 1203 is controlled by the drive signal $S_{drv}$ to be slowly turned on during the sloping ramp up and to be slowly turned off during the sloping ramp down.

Figure 20:
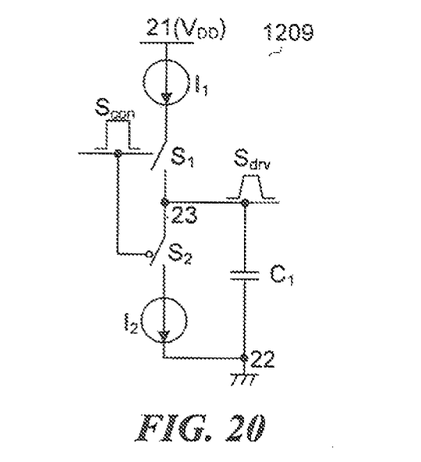
FIG. 20 schematically shows a detailed configuration of the ramp up/down delay circuit 1209 in the power converter 1200 in FIG. 19 in accordance with an embodiment of the present disclosure.

FIG. 20 schematically shows a detailed configuration of the ramp up/down delay circuit 1209 in the power converter 1200 in FIG. 19 in accordance with an embodiment of the present disclosure. As shown in FIG. 20, the ramp up/down circuit 1209 comprises: a supply node 21 configured to receive a supply voltage $V_{DD}$; a reference node 22; a common node 23; a first current source $I_1$ and a first switch $S_1$ coupled in series between the supply node 21 and the common node 23; a second current source $I_2$ and a second switch $S_2$ coupled in series between the common node 23 and the reference node 22; and a charge capacitor $C_1$ coupled between the common node 23 and the reference node 22; wherein the first switch $S_1$ and the second switch $S_2$ respectively has a control terminal configured to receive the control signal $S_{con}$, and wherein the drive signal $S_{drv}$ is generated at the common node 23.

In the example of FIG. 20, the first switch $S_1$ is turned on and the second switch $S_2$ is turned off when the control signal $S_{con}$ is high, and the first switch $S_1$ is turned off and the second switch $S_2$ is turned on when the control signal $S_{con}$ is low.

During the operation of the power converter 1200, when the rectified DC signal ($V_{DC}$) enters the voltage window, the control signal $S_{con}$ generated by the switch controller 1206 goes to be high, which turns on the first switch $S_1$ and turns off the second switch $S_2$. Accordingly, the charge capacitor $C_1$ is charged by the first current source $I_1$ and the voltage across the charge capacitor $C_1$ (i.e., the drive signal $S_{drv}$) increases. When the rectified DC signal ($V_{Dc}$) exits the voltage window, the control signal $S_{con}$ generated by the switch controller 1206 goes to be low, which turns off the first switch $S_1$ and turns on the second switch $S_2$. Accordingly, the charge capacitor $C_1$ is discharged by the second current source $I_2$, and the voltage across the charge capacitor $C_1$ (i.e., the drive signal $S_{drv}$) decreases. As a result, the drive signal $S_{drv}$ as trapezoidal shape is generated.

The trapezoidal shaped drive signal $S_{drv}$ is then used to control the power switch device 1203. The power switch device 1203 would be first slowly turned on when the drive signal $S_{drv}$ is ramping up, and be on when the drive signal $S_{drv}$ is high, and be slowly turned off when the drive signal $S_{drv}$ is ramping down.

Figure 21:
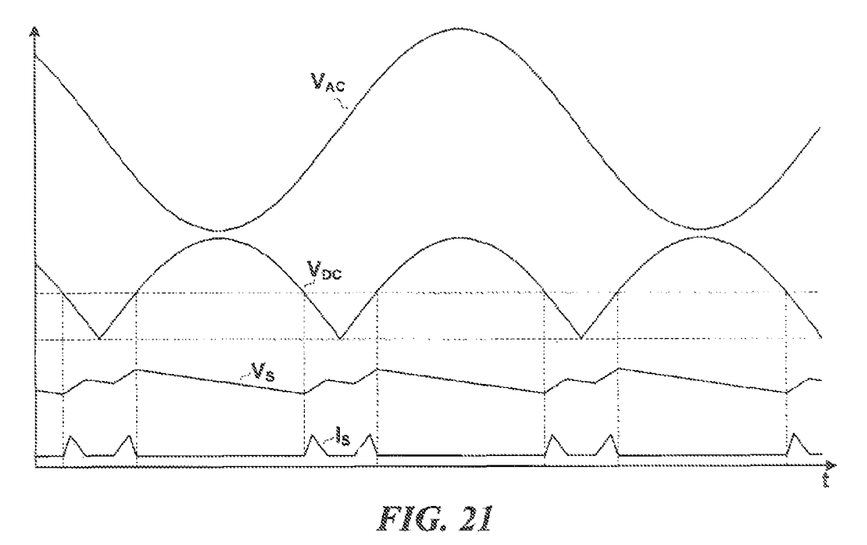
FIG. 21 schematically shows timing diagrams of the input AC signal ($V_{AC}$), the rectified DC signal ($V_{DC}$), the storage voltage ($V_S$) and the current ($I_S$) flowing-through the power switch device when the current ($I_S$) flowing through the power switch device is below its maximum capability in the power converter 1200 in FIG. 19.

If the current ($I_S$) flowing through the power switch device is below its maximum capability, the current waveform is triangular, the corresponding timing diagrams of the input AC signal ($V_{AC}$), the rectified DC signal ($V_{DC}$), the storage voltage ($V_S$) and the current ($I_S$) flowing through the power switch device are shown in FIG. 21.

Figure 22:
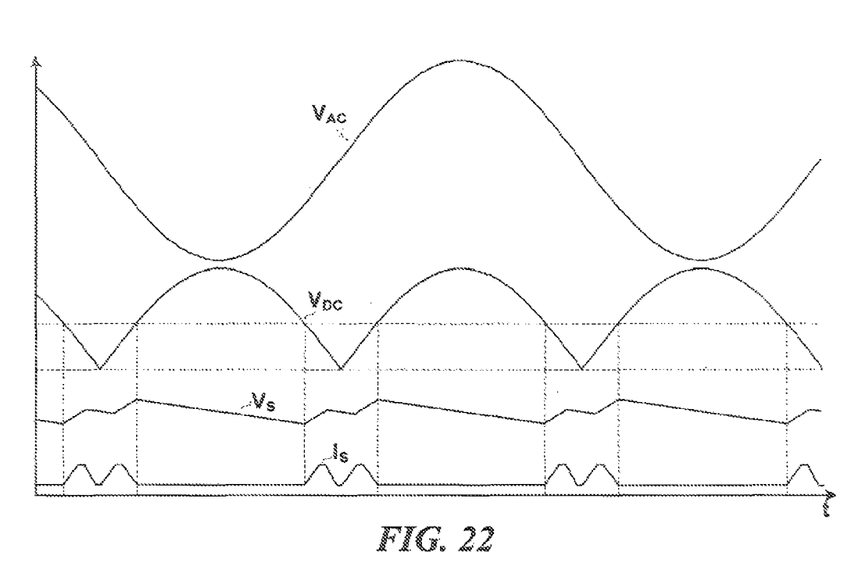
FIG. 22 schematically shows timing diagrams of the input AC signal ($V_{AC}$), the rectified DC signal ($V_{DC}$), the storage voltage ($V_S$) and the current ($I_S$) flowing through the power switch device when the current ($I_S$) flowing through the power switch device is beyond its maximum capability in the power converter 1200 in FIG. 19.

If the current ($I_S$) flowing through the power switch device is beyond its maximum capability, the current waveform becomes trapezoidal, the corresponding timing diagrams of the input AC signal ($V_{AC}$), the rectified DC signal ($V_{Dc}$), the storage voltage ($V_S$) and the current ($I_S$) flowing through the power switch device is shown in FIG. 22.

Figure 23:
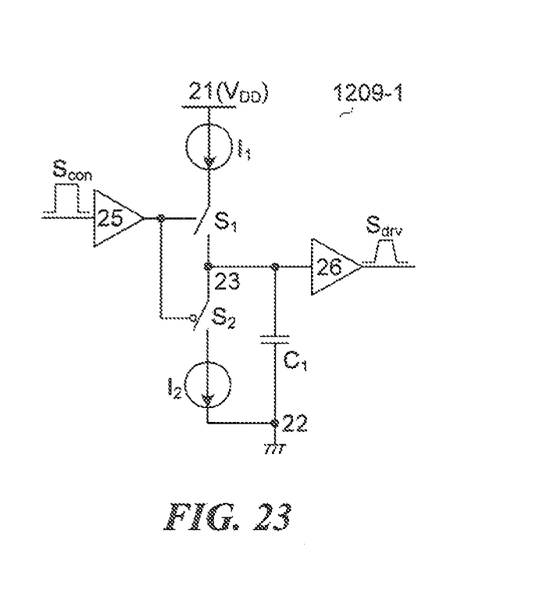
FIG. 23 schematically shows a detailed configuration of the ramp up/down delay circuit 1209-1 in the power converter 1200 in FIG. 19 in accordance with an embodiment of the present disclosure.

FIG. 23 schematically shows a detailed configuration of the ramp up/down delay circuit 1209-1 in the power converter 1200 in FIG. 19 in accordance with an embodiment of the present disclosure. The ramp up/down delay circuit 1209-1 is similar to the ramp up/down delay circuit 1209 in FIG. 20, with a difference that the ramp up/down delay circuit 1209-1 in FIG. 23 further comprises: a first buffer 25 having an input terminal and an output terminal, wherein the input terminal is configured to receive the control signal $S_{con}$, the output terminal is coupled to the control terminals of the first switch $S_1$ and the second switch $S_2$; and a second buffer 26 having an input terminal and an output terminal, wherein the input terminal is coupled to the common node 23 to receive the voltage across the charge capacitor $C_1$, and the drive signal $S_{drv}$ is provided at the output terminal of the second buffer 26.

The operation of the ramp up/down delay circuit 1209-1 in FIG. 23 is similar to that of the ramp up/down delay circuit 1209 in FIG. 20.

Figure 24:
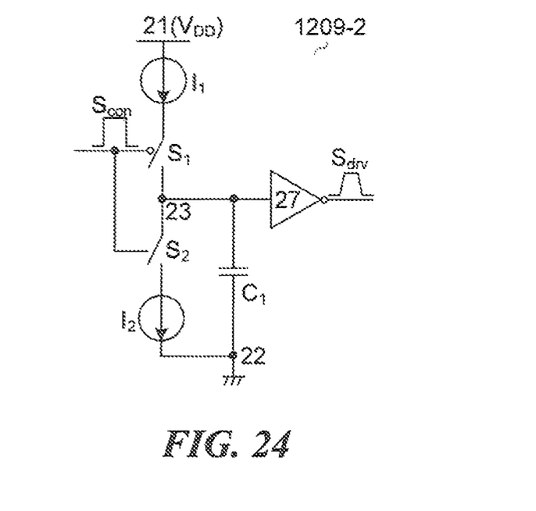
FIG. 24 schematically shows a detailed configuration of the ramp up/down delay circuit 1209-2 in the power converter 1200 in FIG. 19 in accordance with an embodiment of the present disclosure.

FIG. 24 schematically shows a detailed configuration of the ramp up/down delay circuit 1209-2 in the power converter 1200 in FIG. 19 in accordance with an embodiment of the present disclosure. The ramp up/down delay circuit 1209-2 is similar to the ramp up/down delay circuit 1209 in FIG. 20, with a difference that in the example of FIG. 24, the first switch $S_1$ is turned off and the second switch $S_2$ is turned on when the control signal $S_{con}$ is high, and the first switch $S_1$ is turned on and the second switch $S_2$ is turned off when the control signal $S_{con}$ is low; and the ramp up/down delay circuit 1209-2 in FIG. 24 further comprises an inverter 27 having an input terminal and an output terminal, wherein the input terminal is coupled to the common node 23 to receive the voltage across the charge capacitor $C_1$, and the drive signal $S_{drv}$ is provided at the output terminal of the inverter 27.

During the operation of the power converter 1200 with the ramp up/down delay circuit 1209-2, when the rectified DC signal ($V_{DC}$) enters the voltage window, the control signal $S_{con}$ generated by the switch controller 1206 goes to be high, which turns off the first switch $S_1$ and turns on the second switch $S_2$. Accordingly, the charge capacitor $C_1$ is discharged by the second current source $I_2$ and the voltage across the charge capacitor $C_1$ decreases linearly. When the rectified DC signal ($V_{DC}$) exits the voltage window, the control signal $S_{con}$ generated by the switch controller 1206 goes to be low, which turns on the first switch $S_1$ and turns off the second switch $S_2$. Accordingly, the charge capacitor $C_1$ is charged by the first current source $I_1$ and the voltage across the charge capacitor $C_1$ increases linearly. Then the voltage across the charge capacitor $C_1$ is inverted by the inverter 27. As a result, the drive signal $S_{drv}$ as trapezoidal shape is generated.

Thus several embodiment of the foregoing power converter with the ramp up/down delay circuit minimize EMI by controlling the current slew rate during ON-OFF or OFF-ON transition of the power switch device. If properly optimized, overall system EMI solution will lead to minimum system cost as fewer external EMI components are required.

Figure 25:
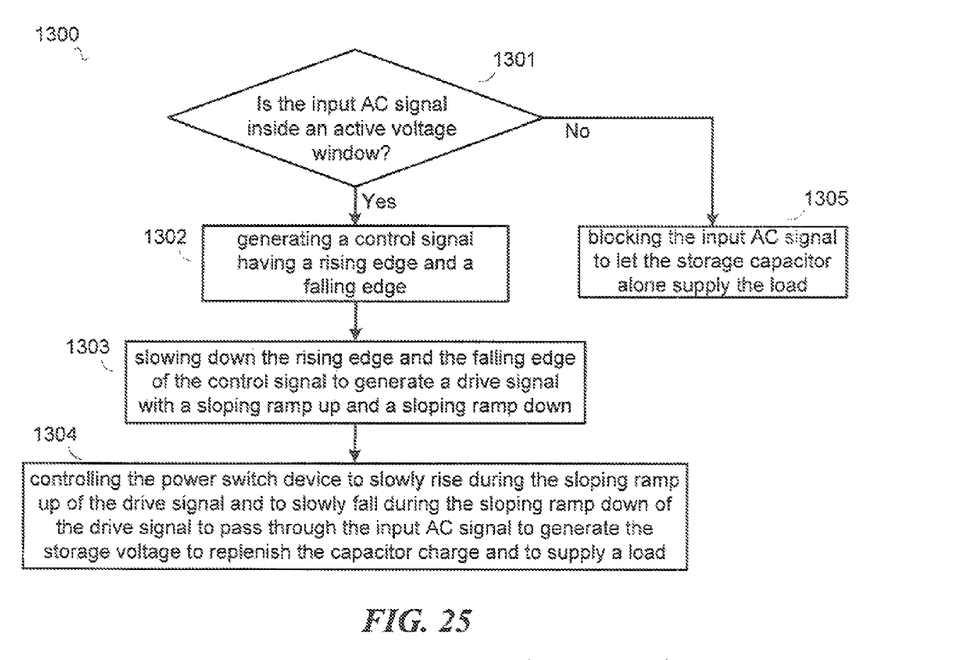
FIG. 25 schematic shows a flowchart 1300 of a method used in a power converter in accordance with an embodiment of the present disclosure.

FIG. 25 schematic shows a flowchart 1300 of a method used in a power converter in accordance with an embodiment of the present disclosure. The power converter is configured to receive an input AC signal and to provide a storage voltage based thereupon, wherein the power converter comprises at least a power switch device and a storage capacitor, and the method comprises:

Step 1301, judging whether the input AC signal is inside an active voltage window. If the input AC signal is within the active voltage window, go to step 1302; if the input AC signal is outside the active voltage window, go to step 1305.

Step 1302, generating a control signal having a substantially vertical rising edge and a substantially vertical falling edge.

Step 1303, slowing down the rising edge and the falling edge of the control signal to generate a drive signal with a sloping ramp up and a sloping ramp down.

Step 1304, controlling the power switch device to be slowly turned on during the sloping ramp up of the drive signal and to be slowly turned off during the sloping ramp down of the drive signal to pass through the input AC signal to generate the storage voltage to replenish the capacitor charge and to supply a load.

Step 1305, blocking the input AC signal to let the storage capacitor alone supply the load.

In one embodiment, the step of "slowing down the rising edge and the falling edge of the control signal to generate a drive signal with a sloping ramp up and a sloping ramp down" comprises: charging a charge capacitor in response to the rising edge of the control signal; and discharging the charge capacitor in response to the falling edge of the control signal; wherein a voltage across the charge capacitor is the drive signal.

In one embodiment, the step of "slowing down the rising edge and the falling edge of the control signal to generate a drive signal with a sloping ramp up and a sloping ramp down" comprises: discharging a charge capacitor in response to the rising edge of the control signal; charging the charge capacitor in response to the falling edge of the control signal; and inverting a voltage across of the charge capacitor to get the drive signal.

This written description uses examples to disclose the disclosure, including the best mode, and also to enable a person skilled in the art to make and use the disclosure. The patentable scope of the disclosure may include other examples that occur to those skilled in the art.

We claim:

1. A power converter, comprising:
   an input port configured to receive an input AC signal;
   a rectifier coupled to the input port to receive the input AC signal, and based on the input AC signal, the rectifier provides a rectified DC signal;
   a storage port configured to provide a storage voltage;
   a storage capacitor coupled between the storage port and a reference ground to store energy;
   a first high voltage power device and a power switch device coupled in series between the rectifier and the storage port; and
   an active bleeding unit having a first input terminal, a second input terminal, a third input terminal and an output terminal, wherein the first input terminal is coupled to the storage port to receive the storage voltage, the second input terminal is configured to receive a voltage threshold, the third input terminal is coupled to a connection node of the rectifier and the first high voltage power device, and the output terminal is coupled to the storage port, wherein when the storage voltage falls to the voltage threshold, the active bleeding unit is turned on to pull down the rectified DC signal, and when the storage voltage is above the voltage threshold, the active bleeding unit is in an off state, wherein the active bleeding unit includes a comparator having a first input terminal, a second input terminal and an output terminal, wherein the first input terminal is configured to receive the storage voltage, the second input terminal is configured to receive the voltage threshold, wherein based on the storage voltage and the voltage threshold, the comparator generates a comparison signal at the output terminal and the comparison signal is provided to a discharge switch.

2. The power converter of claim 1, wherein the active bleeding unit further includes:
   the discharge switch and a discharge resistor coupled in series between the third input terminal and the output terminal of the active bleeding unit, wherein the discharge switch has a control terminal coupled to the output terminal of the comparator to receive the comparison signal, wherein based on the comparison signal, the discharge switch is controlled to be turned ON and OFF.

3. The power converter of claim 1, wherein the active bleeding unit further includes:
   the discharge switch and a discharge current source coupled in series between the third input terminal and the output terminal of the active bleeding unit, wherein the discharge switch has a control terminal coupled to the output terminal of the comparator to receive the comparison signal, wherein based on the comparison signal, the discharge switch is controlled to be turned ON and OFF.

4. The power converter of claim 1, wherein the output terminal of the active bleeding unit is connected to the reference ground instead of being coupled to the storage port.

5. The power converter of claim 1, wherein the first high voltage power device comprises a depletion device.

6. The power converter of claim 1, wherein the power switch device comprises a power FET or BJT.

7. A power converter, comprising:
   an input port configured to receive an input AC signal;
   a rectifier coupled to the input port to receive the input AC signal, and based on the input AC signal, the rectifier provides a rectified DC signal;
   a storage port configured to provide a storage voltage;
   a storage capacitor coupled between the storage port and a reference ground to store energy;
   a first high voltage power device and a power switch device coupled in series between the rectifier and the storage port, to block or pass through the rectified DC signal to the storage port;
   a switch controller configured to receive a line voltage sense signal indicative of the voltage level of the rectified DC signal, and wherein based on the line voltage sense signal, the switch controller provides a control signal having a rising edge and a falling edge; and
   a ramp up-down delay circuit coupled to the switch controller to receive the control signal, wherein based on the control signal, the ramp up-down delay circuit generates a drive signal with a sloping ramp up and a sloping ramp down, and wherein the power switch device is controlled by the drive signal to be slowly turned on during the sloping ramp up and to be slowly turned of during the sloping ramp down, wherein the ramp up-down delay circuit comprises;

a supply node configured to receive a supply voltage;
a reference node;
a common node;
a first current source and a first switch coupled in series between the supply node and the common node;
a second current source and a second switch coupled in series between the common node and the reference node; and
a charge capacitor coupled between the common node and the reference node; wherein
the first switch and the second switch respectively has a control terminal configured to receive the control signal, and wherein a voltage across the charge capacitor is the drive signal.

8. The power converter of claim 7, wherein the first switch is turned on and the second switch is turned off when the control signal is high; and the first switch is turned off and the second switch is turned on when the control signal is low.

9. The power converter of claim 7, wherein the ramp up-down delay circuit comprises:
a supply node configured to receive a supply voltage;
a reference node;
a common node;
a first current source and a first switch coupled in series between the supply node and the common node;
a second current source and a second switch coupled in series between the common node and the reference node, wherein the first switch and the second switch respectively has a control terminal;
a charge capacitor coupled between the common node and the reference node;
a first buffer having an input terminal and an output terminal, wherein the input terminal is configured to receive the control signal, the output terminal is coupled to the control terminals of the first switch and the second switch; and
a second buffer having an input terminal and an output terminal, wherein the input terminal is coupled to the common node to receive a voltage across the charge capacitor, and wherein the drive signal is provided at the output terminal of the second buffer.

10. The power converter of claim 9, wherein the first switch is turned on and the second switch is turned off when the control signal is high; and the first switch is turned off and the second switch is turned on when the control signal is low.

11. The power converter of claim 7, wherein the ramp up-down delay circuit comprises:
a supply node configured to receive a supply voltage;
a reference node;
a common node;
a first current source and a first switch coupled in series between the supply node and the common node;
a second current source and a second switch coupled in series between the common node and the reference node, wherein the first switch and the second switch respectively has a control terminal configured to receive the control signal;
a charge capacitor coupled between the common node and the reference node; and
an inverter having an input terminal and an output terminal, wherein the input terminal is coupled to the common node to receive a voltage across the charge capacitor, and wherein the drive signal is provided at the output terminal of the inverter.

12. The power converter of claim 11, wherein the first switch is turned off and the second switch is turned on when the control signal is high; and the first switch is turned on and the second switch is turned off when the control signal is low.

13. The power converter of claim 7, wherein the first high voltage power device comprises a depletion device.

14. The power converter of claim 7, wherein the power switch device comprises a power FET or BJT.

* * * * *